United States Patent Office 3,053,852
Patented Sept. 11, 1962

3,053,852
PHOSPHOROTHIOLOTHIONATES DERIVED FROM VINYLENE CARBONATE AND VINYLENE SULFITE
Harry W. Coover, Jr., and Richard L. McConnell, Kingsport, Tenn., assignors to Eastman Kodak Company, Rochester, N.Y., a corporation of New Jersey
No Drawing. Filed Aug. 21, 1958, Ser. No. 756,277
6 Claims. (Cl. 260—327)

This invention relates to new organophosphorus compounds and to their method of preparation. In a specific aspect this invention relates to the preparation of new organophosphorus compounds by the reaction of dialkyl phosphorothiolothionates with vinylene carbonate or vinylene sulfite and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is anther object of this invention to provide a novel method for preparing the new and useful organophosphorus compounds. It is still another object of this invention to provide new and valuable insecticides that can be used in various insecticidal compositions.

In accordance with this invention it has been found that new organophosphorus compounds, useful as insecticides, can be prepared by reacting dialkyl phosphorothiolothionates with vinylene carbonate or vinylene sulfite. The new products of this invention have the structural formula:

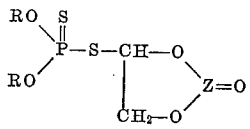

wherein R is a lower alkyl radical containing 1 to 4 carbon atoms and Z is an element having a valency of 4 and selected from the group consisting of carbon and sulfur.

The products of this invention are formed in accordance with the following equations:

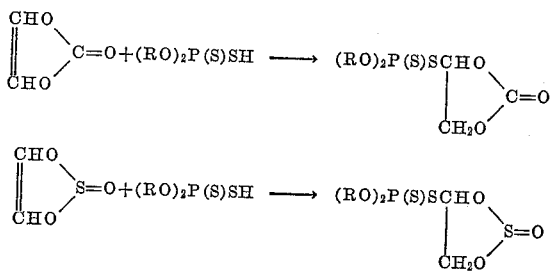

wherein R is as defined above.

In the practice of this invention we prefer to add one of the reactants gradually to a reactor containing the other reactant. For example, the sulfite or carbonate can be added gradually to a reactor containing the dialkylphosphorothiolothionate. Alternatively however, the reverse procedure of addition of reactants can be used and the dialkylphosphorothiolothionate can be added to a reactor containing the sulfite or carbonate. Normally it is desirable to employ a reactor provided with adequate means of agitation and, since the reaction is quite exothermic, it is also desirable to employ a reactor that is provided with adequate cooling means.

The operable temperature range for the reaction is generally from 0° C. to 200° C. and the preferred temperature range is from 25 to 125° C. However, it will be realized that in some instances temperatures outside this range can be employed. The reaction time usually varies from about ½ to 8 hours, but longer and shorter reaction periods are sometimes used. Normally it is unnecessary to employ a catalyst for the reaction since the dialkyl phosphorothiolothionate will react with sufite or carbonate in the absence of a catalyst. If it is considered desirable to employ a catalyst, there are certain catalysts that can be used, for example, the tertiary amines, such as triethylamine, and the like.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants. However, it is within the scope of our invention to use any molar ratio of reactants.

The vinylene carbonate and vinylene sulfite used in practicing our invention can be prepared by the chlorination of the corresponding ethylene carbonate or ethylene sulfite followed by dehydrochlorination of the resulting product.

The following examples are illustrative of the compounds within the scope of this invention, their method of preparation and their utility as insecticides.

*Example 1.—O,O—Diethyl-S-(2-Oxo-1,3-Dioxolan-4-Yl) Phosphorothiolothionate*

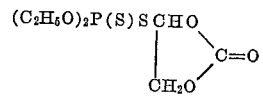

Vinylene carbonate (0.1 mole) and diethyl phosphorothiolothionate (0.1 mole) were mixed with stirring. The reaction mixture was heated gently on a steam bath for approximately 30 minutes. The product is a viscous oil. The crude reaction product was stripped under reduced pressure to remove volatile impurities.

The reaction was repeated using 1 ml. of triethyl amine as a catalyst and a similar product was obtained.

Similar results were obtained using dimethyl, dipropyl, diisopropyl, dibutyl, and diisobutyl phosphorothiolothionates.

*Example 2.—O,O-Diethyl S-(2-Oxo-1,3,2-Dioxothiolan-4-yl) Phosphorothiolothionate*

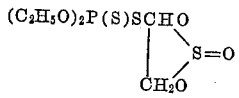

Vinylene sulfite (0.2 mole) and diethyl phosphorothiolothionate (0.2 mole) were reacted according to the procedure described in Example 1. The product is a transparent amber oil.

Similar results were obtained using dimethyl, dipropyl, diisopropyl, dibutyl and diisobutyl phosphorothiolothionates.

*Example 3.—Insecticidal Activity*

Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were then placed on damp paper toweling in Petri dishes and observed after 24 hours for mortality among the adult mites.

It should be noted that tests using acetone-water solutions (containing none of the toxicant) kill none of the mites.

| Toxicant | Concentration of toxicant, p.p.m. | Percent Kill Mites |
|---|---|---|
| Product of Example 1 | 100 | 100 |
| Product of Example 2 | 100 | 100 |

The compounds derived from the other phosphorothiolothionates described in Examples 1 and 2 were similarly effective when tested in the above manner.

This invention has been described in detail with particular reference to preferred embodiments thereof, but it will be understood that variations and modifications can be effected within the spirit and scope of the invention as described above and as defined in the appended claims.

We claim:

1. Organophosphorus compounds having the structural formula:

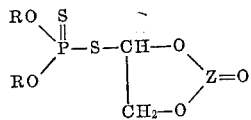

wherein R is a lower alkyl radical and Z is a member selected from the group consisting of carbon and sulfur.

2. O,O-diethyl S-(2-oxo-1,3-dioxolan-4-yl) phosphorothiolothionate.

3. O,O-diethyl S-(2-oxo-1,3,2-dioxothiolan-4-yl) phosphorothiolothionate.

4. The method for producing the compounds of claim 1 which comprises reacting a di-lower alkyl phosphorothiolothionate with a compound selected from the group consisting of vinylene carbonate and vinylene sulfite at a temperature within the range of 0° C. to 200° C.

5. The method for producing the compound of claim 2 which comprises reacting diethyl phosphorothiolothionate with vinylene carbonate at a temperature within the range of 0° C. to 200° C.

6. The method for producing the compound of claim 3 which comprises reacting diethyl phosphorothiolothionate with vinylene sulfite at a temperature within the range of 0° C. to 200° C.

No references cited.